United States Patent
Ha et al.

(10) Patent No.: US 9,298,254 B2
(45) Date of Patent: Mar. 29, 2016

(54) MOVABLE DISPLAY APPARATUS, ROBOT HAVING MOVABLE DISPLAY APPARATUS AND DISPLAY METHOD THEREOF

(75) Inventors: Tae Sin Ha, Seoul (KR); Woo Sup Han, Yongin-si (KR); Byung Kwon Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 571 days.

(21) Appl. No.: 12/654,536

(22) Filed: Dec. 22, 2009

(65) Prior Publication Data
US 2010/0185990 A1    Jul. 22, 2010

(30) Foreign Application Priority Data
Jan. 20, 2009    (KR) .................. 10-2009-0004493

(51) Int. Cl.
G06F 3/033    (2013.01)
G06F 3/01    (2006.01)
G06K 9/00    (2006.01)

(52) U.S. Cl.
CPC ........ *G06F 3/01* (2013.01); *G06F 3/012* (2013.01); *G06F 3/013* (2013.01); *G06K 9/00221* (2013.01); *G06K 9/00664* (2013.01)

(58) Field of Classification Search
CPC .......... G06F 3/013; G06F 3/01; G06F 3/012; G06K 9/00221; G06K 9/00664
USPC ........................................ 715/863; 382/153
See application file for complete search history.

(56) References Cited

U.S. PATENT DOCUMENTS

| | | | | |
|---|---|---|---|---|
| 6,505,096 B2 * | 1/2003 | Takenaka et al. | ............. | 700/245 |
| 7,626,569 B2 * | 12/2009 | Lanier | .................. | G06F 1/1601 |
| | | | | 345/156 |
| 7,714,895 B2 * | 5/2010 | Pretlove et al. | ............ | 348/211.2 |
| 8,009,029 B2 * | 8/2011 | Hideshiro | .............. | B60K 35/00 |
| | | | | 340/425.5 |
| 2004/0061831 A1 * | 4/2004 | Aughey et al. | ................. | 351/209 |
| 2004/0179714 A1 * | 9/2004 | Jouppi | .......................... | 382/103 |
| 2007/0064092 A1 * | 3/2007 | Sandbeg et al. | ............ | 348/14.02 |

(Continued)

FOREIGN PATENT DOCUMENTS

JP    H08-223455 A    8/1996
KR    20-0441761 Y1    9/2008

OTHER PUBLICATIONS

"Passive Driver Gaze Tracking with Active Appearance Models" by, Ishikawa et al. Feb. 2004.*

(Continued)

*Primary Examiner* — Steven Sax
*Assistant Examiner* — Christopher J Fibbi
(74) *Attorney, Agent, or Firm* — Harness, Dickey & Pierce, P.L.C.

(57) ABSTRACT

A movable display apparatus, a robot having the movable display apparatus, and a display method thereof, and, more particularly, a display method of a robot having an apparatus to display an image according to a visual point of a user are provided. It is possible to provide a convenient extended image service, by movably mounting the apparatus to display the image according to the visual point of the user and mounting the movable display apparatus in the robot so as to accurately display the image according to the visual point of the user using the mobility and motion of the robot. In addition, it is possible to provide an image, which is viewed like a three-dimensional image, via a two-dimensional display apparatus, by changing the displayed image according to a variation in the sightline of the user.

17 Claims, 7 Drawing Sheets

(56) References Cited

U.S. PATENT DOCUMENTS

| | | | |
|---|---|---|---|
| 2007/0192910 A1* | 8/2007 | Vu et al. | 901/17 |
| 2007/0230797 A1* | 10/2007 | Hisanaga | 382/195 |
| 2007/0233318 A1* | 10/2007 | Lei | 700/245 |
| 2010/0295769 A1* | 11/2010 | Lundstrom | 345/156 |

OTHER PUBLICATIONS

Korean Office Action dated May 20, 2015 issued in corresponding Korean Application No. 10-2009-0004493 (with English translation).

* cited by examiner

MOVABLE DISPLAY APPARATUS, ROBOT HAVING MOVABLE DISPLAY APPARATUS AND DISPLAY METHOD THEREOF

CROSS-REFERENCE TO RELATED APPLICATIONS

This application claims the benefit of Korean Patent Application No. 2009-0004493, filed on Jan. 20, 2009 in the Korean Intellectual Property Office, the disclosure of which is incorporated herein by reference.

BACKGROUND

1. Field

One or more embodiments of the present disclosure relate to a movable display apparatus, a robot having the movable display apparatus, and a display method thereof, and, more particularly, to a display method of a robot having an apparatus to display an image according to a visual point of a user.

2. Description of the Related Art

Generally, a machine for performing motions similar to those of a human being but using an electrical or magnetic action is called a robot. Recently, with the development of sensors and controllers, robots are used in various fields. For example, there are domestic assistant robots, service robots for public places, transportation robots for a production place, operator assistant robots and so on. Such robots can provide various services to users using mobility and motion thereof. Recently, a display apparatus for providing an image service is mounted on the main body of a robot such that a user may approach the robot and receive an image service using the display apparatus of the robot. If interaction with the user is required, for example via a touch screen, the display apparatus is preferably fixed to the main body of the robot for touch efficiency. In contrast, if a display apparatus for providing an image service is fixed to the main body of the robot, the user views the image at a fixed visual point and thus the user is inconvenienced, especially when the user must view the image for a long time.

In order to solve such a problem, in the case of a display apparatus for providing an image service, a method of displaying an image according to a visual point of a user by mounting a display apparatus at an end (an end-effector) of a manipulator (a link structure, an arm, and so on) of a robot and changing the position of the display apparatus using the mobility and motion of the robot has been suggested. However, since it is difficult to accurately measure the visual point of the user, the method of adjusting a display screen according to the visual point of the user is restricted. In addition, even when the visual point of the user is changed, an image screen provided by the display apparatus is not changed. Thus, a convenient extended service cannot be provided to the user.

SUMMARY

Therefore, it is an aspect of the present disclosure to provide a display method that is capable of displaying an image according to a visual point of a user, using the mobility and motion of a robot, by mounting a movable display apparatus on the robot.

Additional aspects and/or advantages of the disclosure will be set forth in part in the description which follows and, in part, will be obvious from the description, or may be learned by practice of the embodiments described herein.

In accordance with the present disclosure, the above and/or other aspects can be achieved by the provision of a movable display apparatus including: a display unit to display an image; a camera provided on the display unit to acquire an image of a user; a head mounted device (HMD) to measure a head rotation direction and a pupil direction of the user; a control unit to recognize the sightline of the user using the image of the user acquired by the camera and the head rotation direction and the pupil direction measured by the HMD and control the posture of the display unit according to the recognized sightline of the user; and a driving unit to move the display unit under the control of the control unit.

The movable display apparatus may further include a camera image processing unit to extract a face direction of the user from the user image acquired by the camera, and the control unit may estimate the head rotation direction for recognizing the sightline of the user using the extracted face direction and the measured head rotation direction of the user.

The movable display apparatus may further include a camera image processing unit to extract the pupil direction of the user from the user image acquired by the camera, and the control unit may estimate the pupil direction for recognizing the sightline of the user using the extracted pupil direction and the measured pupil direction of the user.

The control unit may recognize the sightline direction of the user using the estimated head rotation direction and pupil direction, control the posture of the display unit according to the recognized sightline direction of the user, and provide the displayed image according to the sightline of the user.

The control unit may decide the posture of the display unit such that the center of mass (COM) according to the motion of the display unit is positioned on the center of the display unit.

In accordance with another aspect of the present disclosure, there is provided a robot including: a display unit movably provided on a manipulator to display an image; a camera provided on the display unit to acquire an image of a user; a head mounted device (HMD) to measure a head rotation direction and a pupil direction of the user; a control unit to recognize the sightline of the user using the image of the user acquired by the camera and the head rotation direction and the pupil direction measured by the HMD and control the posture of the display unit according to the recognized sightline of the user; and a driving unit to move the manipulator and change the posture of the display unit under the control of the control unit.

The control unit may recognize the sightline direction of the user using the estimated head rotation direction and pupil direction, compute a difference between the sightline position of the user and the current position of the display unit, and generate a motion path of the manipulator.

The control unit may check a variation in the center of mass (COM) when the display unit is positioned at the sightline position of the user, and move a main body of the robot.

The control unit may change the image displayed on the display unit according to a variation in the sightline of the user.

In accordance with another aspect of the present disclosure, there is provided a display method of a robot, the method including: providing an image service using a display unit movably provided on a manipulator; acquiring an image of a user who receives the image service; measuring a head rotation direction and a pupil direction of the user; and recognizing the sightline of the user using the acquired image of the user and the measured head rotation direction and pupil direction of the user and controlling the posture of the display unit according to the recognized sightline of the user to track the sightline of the user.

The method may further include extracting a face direction of the user from the acquired image of the user, and the recognizing of the sightline of the user may include estimating the head rotation direction of the user using the extracted face direction and the measured head rotation direction of the user.

The method may further include extracting the pupil direction of the user from the acquired image of the user, and the recognizing of the sightline of the user may include estimating the pupil direction of the user using the extracted pupil direction and the measured pupil direction of the user.

The recognizing of the sightline of the user may include recognizing the sightline position of the user using the head rotation direction and the pupil direction.

The tracking of the sightline of the user may include computing a difference between the sightline position of the user and the current position of the display unit and generating a motion path of the manipulator.

The tracking of the sightline of the user may include checking a variation in the center of mass (COM) of the robot when the display unit is positioned at the sightline position of the user, and moving a main body of the robot.

The tracking of the sightline of the user may include changing the image displayed on the display unit according to a variation in the sightline of the user.

It is possible to provide a convenient extended service to the user, by movably mounting the apparatus to display the image according to the visual point of the user and mounting the movable display apparatus in the robot so as to accurately display the image according to the visual point of the user using the mobility and motion of the robot. In addition, it is possible to provide an image, which is viewed like a three-dimensional image, via a two-dimensional display apparatus, by changing the displayed image according to a variation in the sightline of the user.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings.

Figure 1:
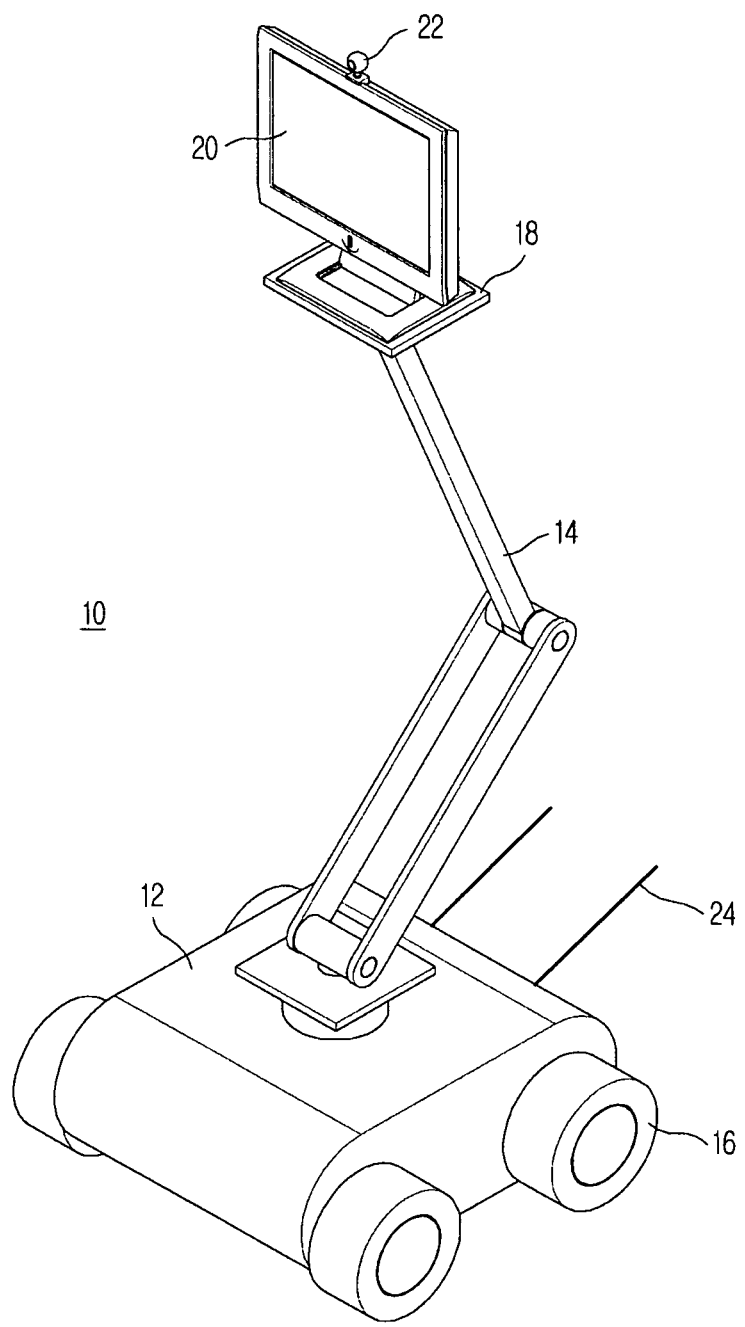
FIG. 1 is a view showing the outer appearance of a robot according to an embodiment of the present disclosure.

FIG. 1 is a view showing the outer appearance of a robot according to an embodiment of the present disclosure. The robot provides various services to a user while automatically moving due to the robot's capability for mobility and motion.

In FIG. 1, the robot 10, according to the embodiment of the present disclosure, may include, for example, a main body 12 forming the outer appearance of the robot, a manipulator 14 mounted on the main body 12 to perform a motion operation of the robot 10, and driving wheels 16 mounted under the main body 12 to change the position of the robot 10.

A display unit 20 to provide image data to a user is mounted at an end (hereinafter, referred to as an end-effector) 18 of the manipulator 14, and a camera 22 to photograph the user and acquire user image information is mounted on the upper portion of the display unit 20, although the camera may alternatively be mounted in other locations.

The manipulator 14 is manufactured to move similar to the action of the arm or the hand of a user by way of an electrical/mechanical mechanism. The robot manipulator 14 that is currently being used is mostly configured by connecting several links. Connections between the links are called joints. The motion characteristic of the robot manipulator 14 is determined according to the geometrical relationship between the links and the joints. Mathematical expression of the geometrical relationship is called kinematics and the manipulator 14 mostly moves the end-effector 18 in a direction for performing an operation with the kinematics characteristic. The manipulator 14 according to an embodiment of the present disclosure changes the positions and the angles (postures) of the display unit 20 and the camera 22 such that the image is displayed according to a visual point of the user using a link device of which the height and the angle can be adjusted.

A data communication unit 24 is mounted on the back side of the driving wheels 16 to receive a sightline direction of the user based on a head rotation direction and a pupil direction of the user, measured by a head mounted device (not shown) placed on the user's head. The term head mounted device is used as a general term for a variety of devices that are placed on a user's head. The head mounted device includes a head mounted display, and is hereinafter referred to as an HMD.

Figure 2:
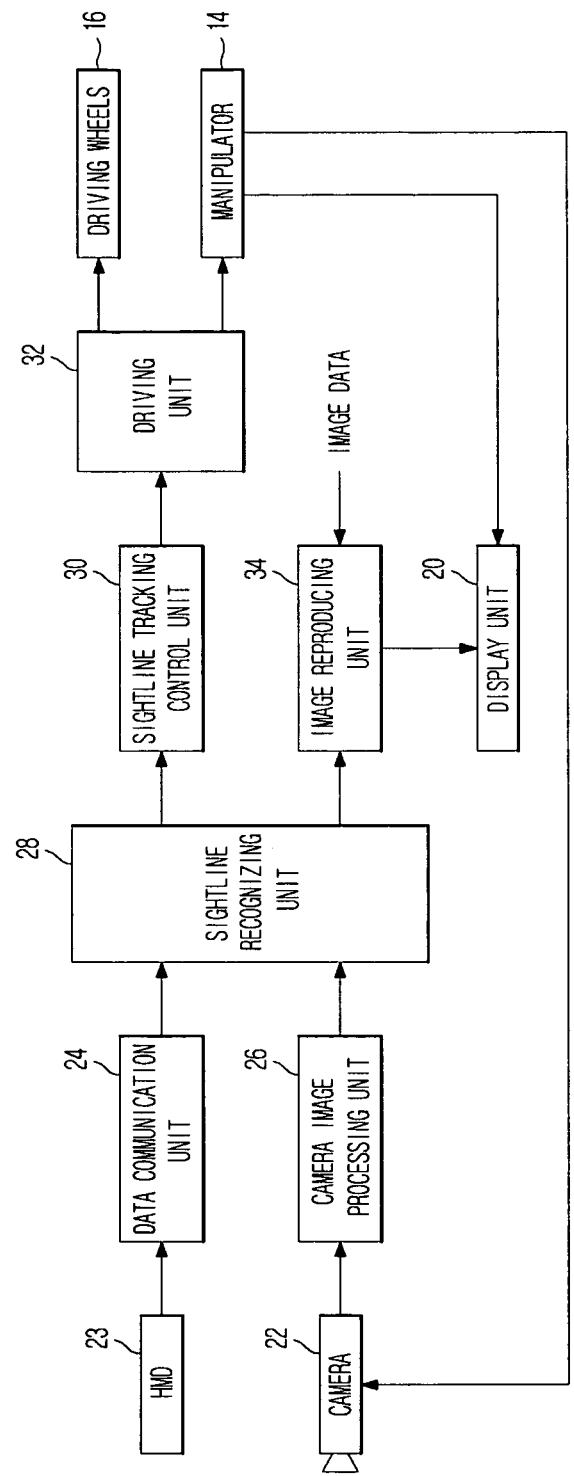
FIG. 2 is a control block diagram of the robot of the embodiment of the present disclosure.

FIG. 2 is a control block diagram of a robot of an embodiment of the present disclosure, which robot includes the data communication unit 24, a camera image processing unit 26, a sightline recognizing unit 28, a sightline tracking control unit 30, a driving unit 32, and an image reproducing unit 34.

The data communication unit 24 may be mounted on the back side of the driving wheels 26 to acquire user sightline information using the HMD 23. The HMD 23 is put on the user's head to acquire the motion of the user's head and the motion of the user's eyes. As a representative method, the head rotation direction is measured using a motion sensor (an acceleration sensor or a gyroscope or both) and the motion direction of the pupil of the user is measured using an infrared ray or a sensor or both. The user sightline information based on the head rotation direction and the pupil direction of the user is then sent to the data communication unit 24.

The camera image processing unit 26 receives the user image information acquired by the camera 22 and extracts a face direction, the head rotation direction, and the pupil direction of the user. The camera image processing unit 26 detects the face of the user from the camera image using the face color thereof and extracts the face direction by comparison with an existing database (DB). Image data corresponding to the user's eyes is extracted from the extracted face using template matching of the face feature. In addition, edges are detected from the extracted eye image, the areas of irises (pupils) are detected based on the fact that the eyes each include an area of color, and the pupil direction (position) is extracted.

The sightline recognizing unit 28 recognizes the sightline of the user from any one or more of the face direction, the head rotation direction, and the pupil direction of the user acquired by the camera 22 and the HMD 23. The sightline recognizing unit 28 computes a variation with time in the face direction extracted from the camera image processing unit 26, and estimates the head rotation direction for recognizing the user's sightline on the basis of the variation using the head rotation direction measured by the HMD 23 and the face direction extracted by the camera image processing unit 26.

In addition, the sightline recognizing unit 28 computes the variation with time in the pupil direction extracted by the camera image processing unit 26, and estimates the pupil direction for recognizing the user's sightline on the basis of the variation using the pupil direction measured by the HMD 23 and the pupil direction extracted by the camera image processing unit 26.

The sightline recognizing unit 28 recognizes the sightline direction of the user using the estimated head rotation direction and pupil direction.

The sightline tracking control unit 30 controls the posture (the position and the angle) of the display unit 20 according to the user's sightline recognized by the sightline recognizing unit 28 and provides image data by way of the display unit 20 according to the visual point of the user. The sightline tracking control unit 30 decides the motion of the manipulator 14 and the driving wheels 16 according to the current position of the display unit 20 and the position of the main body 12 of the robot and simultaneously controls the mobility and motion of the robot 10.

In detail, the sightline tracking control unit 30 computes a difference between the sightline position of the user and the current position of the display unit 20 and computes all the angles of the joints for positioning the display unit 20 at the sightline position. The angles are computed using the inverse kinematic characteristic of the manipulator 14 for positioning the end-effector 18 at the sightline position of the user, and a path having a smallest joint angle is selected from the computed joint angles to generate a motion path of the manipulator 14.

In addition, the sightline tracking control unit 30 computes a variation in the center of mass (COM) when the display unit 20 is positioned at the sightline position of the user and computes the stability degree of the robot 10 according to a distance between the center of the main body 12 of the robot and the COM. As the COM becomes distant from the center of the main body 12 of the robot, a probability that the robot 10 falls due to instability is increased. Accordingly, the stability degree of the robot is feedback controlled by defining the distance between the COM and the center of the main body 12 of the robot.

Accordingly, the sightline tracking control unit 30 compares the computed stability degree of the robot 10 with a predetermined reference stability degree range, decides the motion of the driving wheels 16 if the stability degree of the robot 10 deviates from a reference stability degree range, and controls the COM to be positioned at the center of the main body 12 of the robot.

In addition, the sightline tracking control unit 30 changes the image data provided by the display unit 20 according to the variation in the user's sightline, maps three-dimensionally modeled image data to two-dimensional data according to the sightline direction of the user, and outputs the two-dimensional data on the display unit 20. That is, the two-dimensional image is obtained by projecting the three-dimensional image with respect to a plane perpendicular to the sightline direction of the user. Accordingly, it is possible to provide image data which is viewed like an extended image, that is, a three-dimensional image, to the user.

The driving unit 32 changes the position and the angle (posture) of the display unit 20 while the robot 10 moves according to the motion information of the driving wheels 16 and the manipulator 14 decided by the sightline tracking control unit 30, and drives the driving wheels 16 and the manipulator 14 such that the image provided by the display unit 20 is adjusted according to the visual point of the user. The driving unit 32 drives the manipulator 14 according to the motion path generated by the sightline tracking control unit 30 and drives the driving wheels 16 according to the stability degree of the robot 10 computed by the sightline tracking control unit 30.

The image reproducing unit 34 outputs the image data to the display unit 20 according to the visual point of the user. The image data is three-dimensionally modeled and is stored in the robot 10 in advance.

Figure 3:
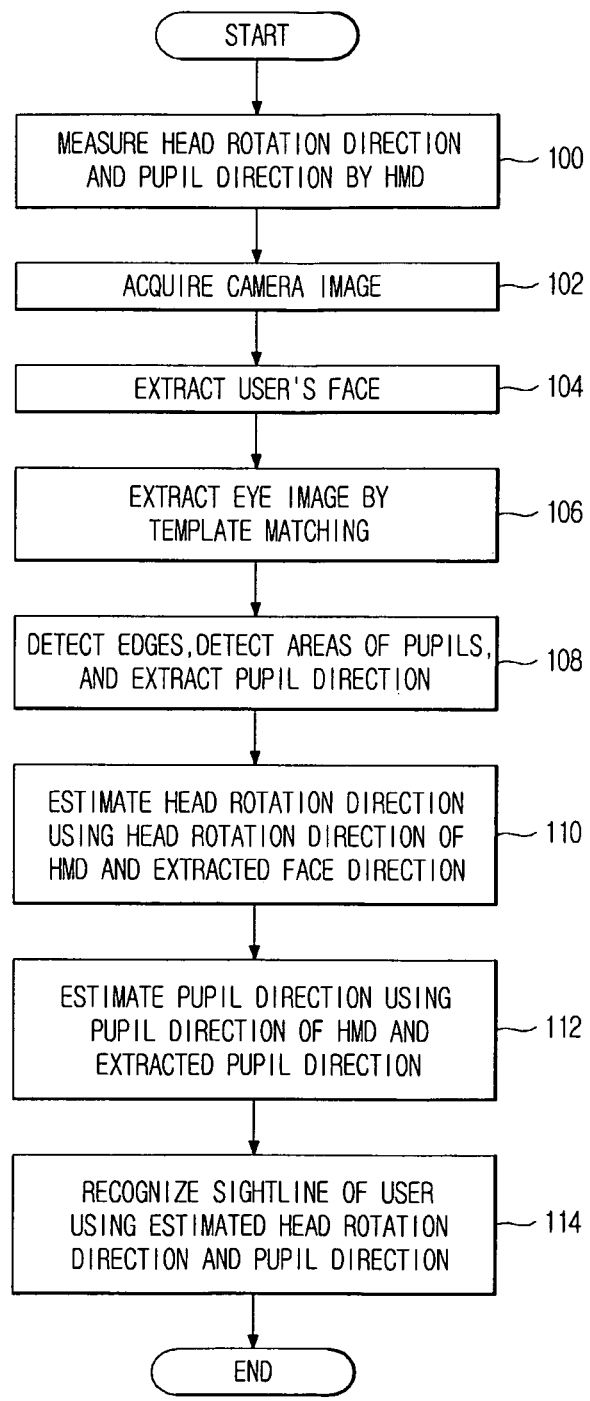
FIG. 3 is a flowchart illustrating a method of recognizing a user's sightline in the robot according to the embodiment of the present disclosure.

FIG. 3 is a flowchart illustrating a method of recognizing the user's sightline in the robot according to an embodiment of the present disclosure.

In FIG. 3, the head rotation direction and the pupil direction of the user are measured by the HMD 23 put on the user's head and are sent to the data communication unit 24 (100). The user who uses the image service provided by the robot 10 is photographed using the camera 22 mounted in the end-effector 18 of the manipulator 14 such that the user image information is acquired (102).

Accordingly, the camera image processing unit 26 detects the user's face from the camera image using the face color and extracts the face direction by a comparison with an existing DB (104). The camera image processing unit 26 extracts image data corresponding to the user's eyes by template matching of the face feature from the extracted user's face (106).

In addition, the camera image processing unit 26 detects the edges of the extracted eye images, detects the areas of the irises (pupils) based on the fact that the eyes each include an area of color, and extracts the pupil direction (position) (108).

The sightline recognizing unit 28 estimates the head rotation direction for recognizing the user's sightline using the head rotation direction measured by the HMD 23 and the face direction extracted by the camera image processing unit 26 (110), and estimates the pupil direction for recognizing the user's sightline using the pupil direction measured by the HMD 23 and the pupil direction extracted by the camera image processing unit 26 (112).

Accordingly, the sightline recognizing unit 28 recognizes the sightline direction of the user using the estimated head rotation direction and pupil direction (114).

Figure 4:
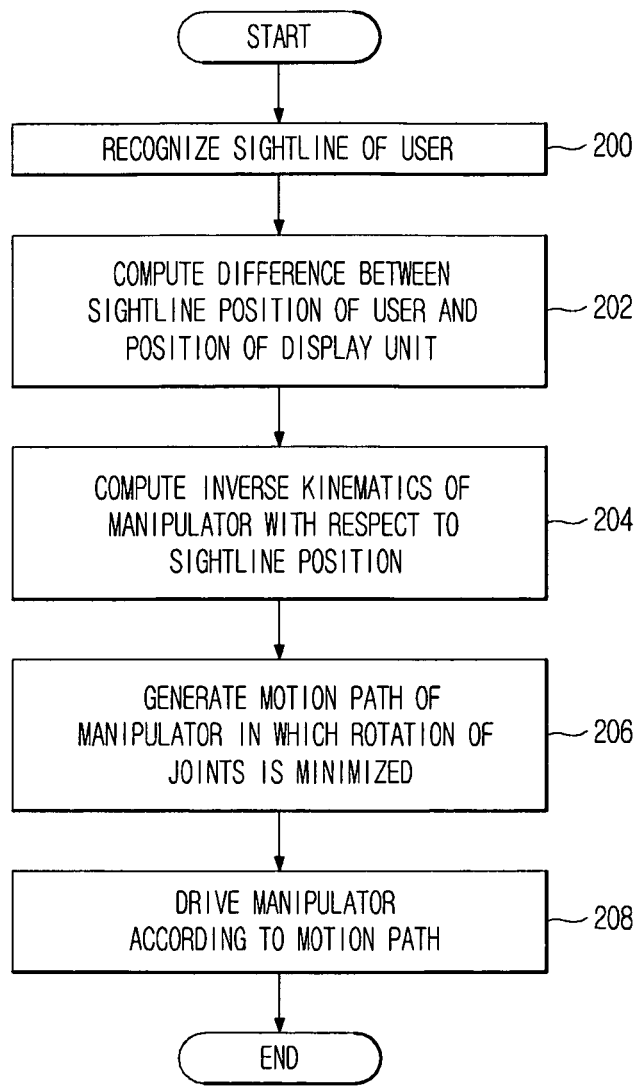
FIG. 4 is a flowchart illustrating a method of controlling a manipulator for tracking the user's sightline in the robot according to the embodiment of the present disclosure.

FIG. 4 is a flowchart illustrating a method of controlling a manipulator for tracking the user's sightline in the robot according to an embodiment of the present disclosure.

In FIG. 4, when the sightline direction of the user is recognized by the sightline recognizing unit 28 (200), the sightline tracking control unit 30 computes the difference between the sightline position of the user and the current position of the display unit 20 (202), and computes all the angles of the joints with the inverse kinematic characteristic of the manipulator 14 for positioning the end-effector 18 at the sightline position of the user (204).

Thereafter, the sightline tracking control unit 30 selects a path having a smallest joint angle of the computed joint angles and generates the motion path of the manipulator 14 in which the rotation of the joints is minimized (206).

Accordingly, the driving unit 32 drives the manipulator 14 according to the motion path generated by the sightline tracking control unit 30 (208).

Figure 5:
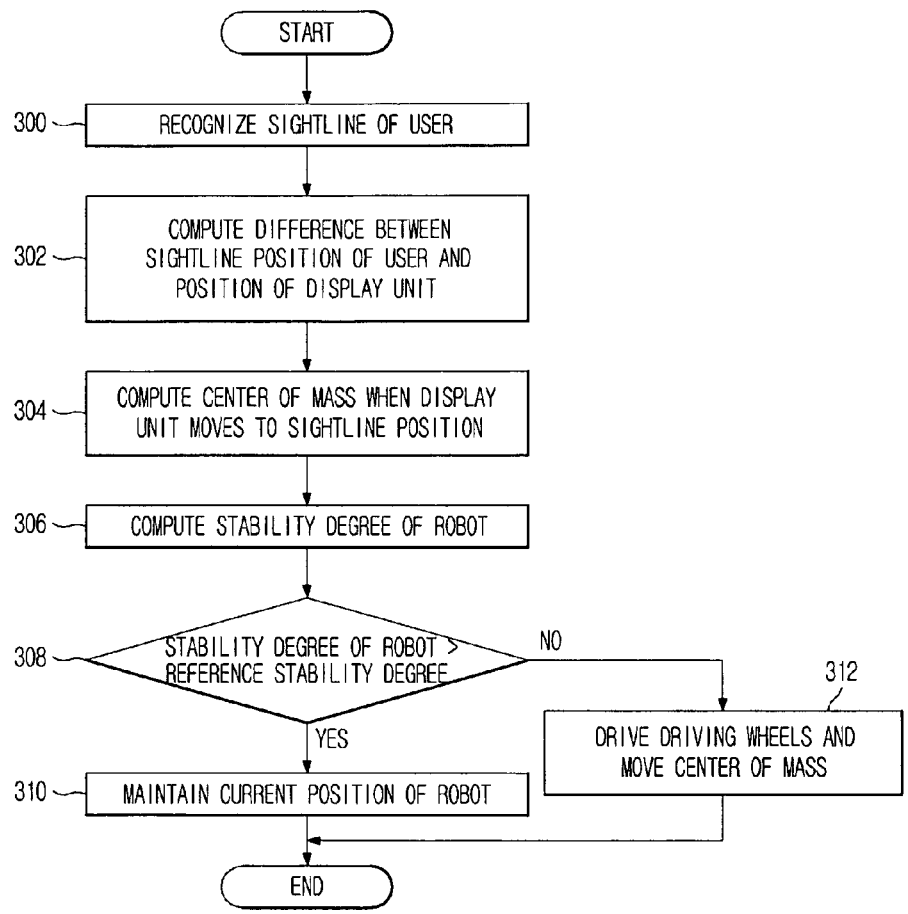
FIG. 5 is a flowchart illustrating a method of controlling driving wheels for tracking the user's sightline in the robot according to the embodiment of the present disclosure.

FIG. 5 is a flowchart illustrating a method of controlling the driving wheels for tracking the user's sightline in the robot according to the embodiment of the present disclosure, which is simultaneously performed with the motion of the manipulator 14 shown in FIG. 4.

In FIG. 5, when the sightline direction of the user is recognized by the sightline recognizing unit 28 (300), the sightline tracking control unit 30 computes the difference between the sightline position of the user and the current position of the display unit 20 (302), and computes the variation in the COM when the display unit 20 moves to the sightline position of the user (304).

Thereafter, the sightline tracking control unit 30 computes the distance between the center of the main body 12 of the robot and the COM according to the computed variation in the COM to compute the stability degree of the robot 10 (306) and compares the stability degree of the robot 10 with the predetermined reference stability degree (308).

If the stability degree of the robot 10 is larger than the reference stability degree in the compared result of Operation 308, then it is determined that the COM is not deviated from the center of the main body 12 of the robot, and the current position of the robot 10 is maintained (310).

If the stability degree of the robot 10 is smaller than the reference stability degree in the compared result of Operation 308, then it is determined that the COM is deviated from the center of the main body 12 of the robot, and the driving wheels 16 are driven such that the COM is positioned on the center of the main body 12 of the robot (312).

Figure 6:
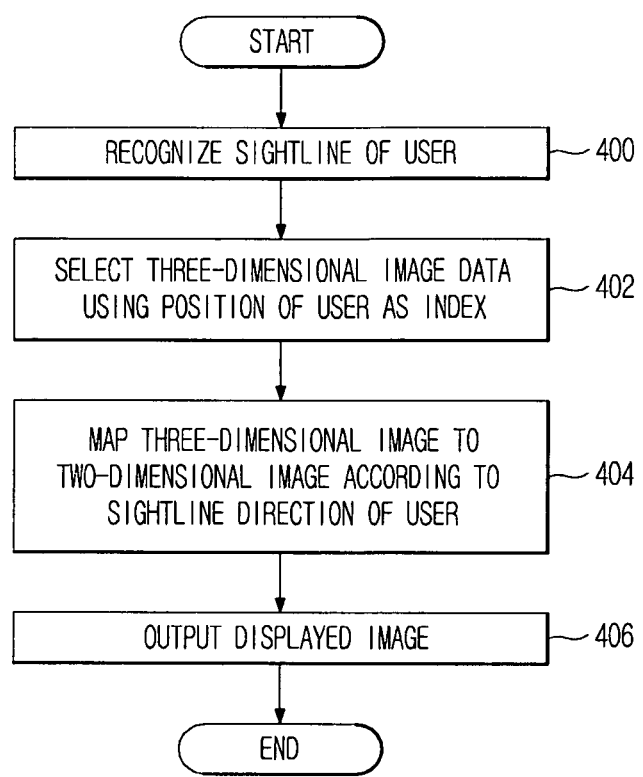
FIG. 6 is a flowchart illustrating a method of reproducing an image according to the user's sightline in the robot according to the embodiment of the present disclosure.

FIG. 6 is a flowchart illustrating a method of reproducing an image according to the user's sightline in the robot according to the embodiment of the present disclosure.

In FIG. 6, when the sightline direction of the user is recognized by the sightline recognizing unit 28 (400), the sightline tracking control unit 30 selects the three-dimensional image data which is stored in advance using the position of the user as an index according to the variation in the user's sightline (402).

Thereafter, the sightline tracking control unit 30 maps the selected three-dimensional image data to the two-dimensional image according to the sightline direction of the user (404), and outputs the image data to the display unit 20 (406). That is, the two-dimensional image is viewed as a three-dimensional image by selecting the sightline direction of the user in the normal direction.

Figure 7:
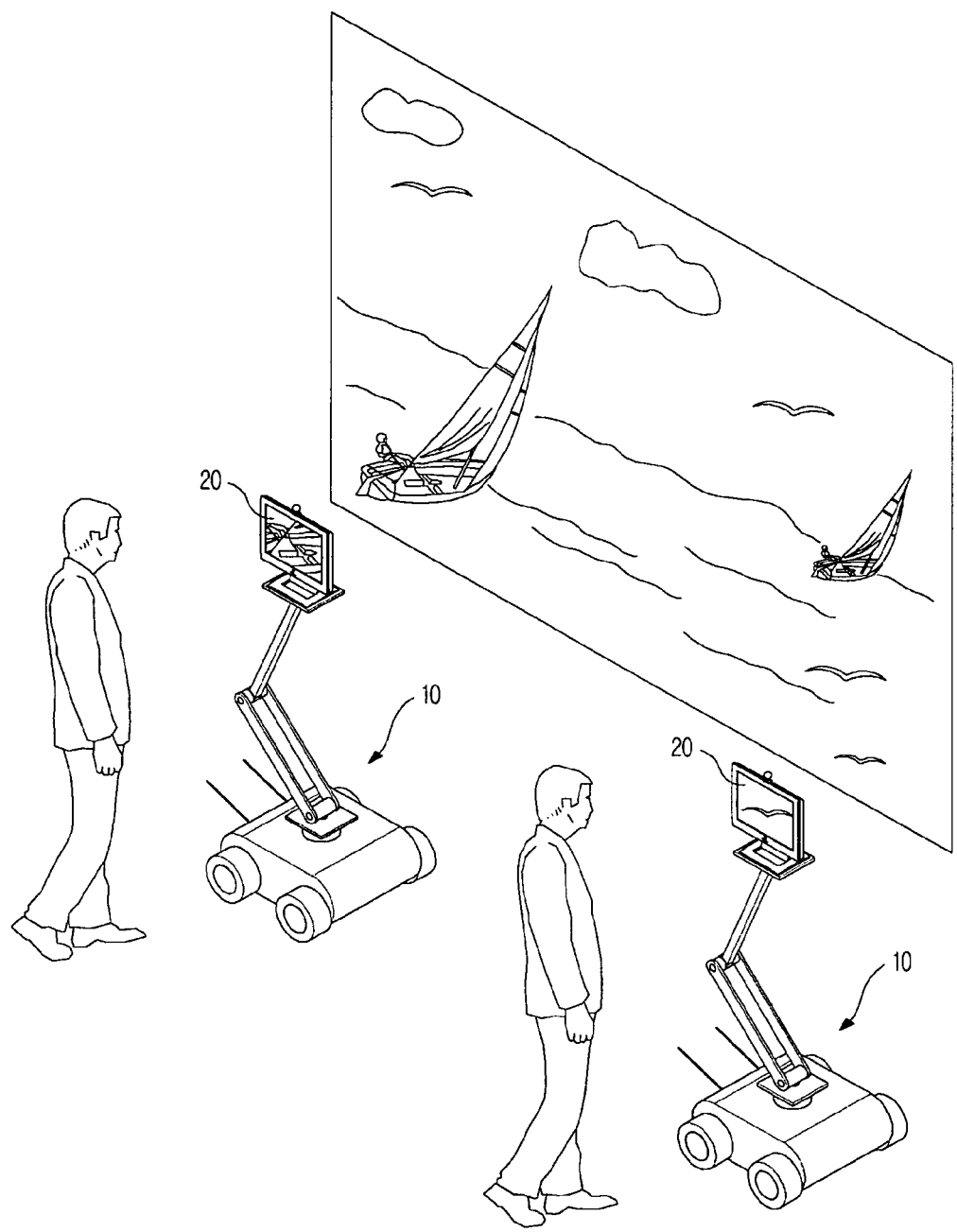
FIG. 7 is a view showing a variation in image data of a display screen according to the user's sightline in the robot according to the embodiment of the present disclosure.

Accordingly, as shown in FIG. 7, it is possible to actively provide image data even when the user moves and the visual point of the user is changed and to provide an image which is viewed like the extended image, that is, a three-dimensional image, by outputting the three-dimensionally modeled image data to the two-dimensional display unit 20 and changing the image data according to a variation in the visual point of the user.

Each of the methods according to the above-described embodiments may be recorded in computer-readable media or processor-readable media including program instructions to implement various operations embodied by a computer or processor. The media may also include, alone or in combination with the program instructions, data files, data structures, and the like.

Examples of computer-readable media or processor-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter.

The described hardware devices may also be configured to act as one or more software modules in order to perform the operations of the above-described embodiments, or vice versa. The methods described here may be executed on a general purpose computer or processor or may be executed on a particular machine such as on the robot or movable display apparatus described herein.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A movable display apparatus comprising:
a display unit configured to display an image;
a camera provided on the display unit and configured to acquire an image of a user;
a head mounted device (HMD) configured to measure a head rotation direction and a pupil direction of the user;
a control unit configured to recognize a sightline of the user using the image of the user acquired by the camera and the head rotation direction and the pupil direction measured by the HMD, control a posture of the display unit according to the recognized sightline of the user, and control the displaying of the image by the display unit according to the recognized sightline of the user;
a camera image processing unit configured to extract a face direction of the user from the image of the user acquired by the camera, wherein the control unit is further configured to estimate the head rotation direction for recognizing the sightline of the user using the extracted face direction and the measured head rotation direction of the user; and
a driving unit configured to move the display unit under the control of the control unit, wherein the display unit is configured to be movably provided on a manipulator to display the image, and the control unit is configured to compute a difference between a sightline position of the user based the recognized sightline of the user and a current position of the display unit, and generate a motion path of the manipulator.

2. The movable display apparatus according to claim 1, wherein the camera image processing unit is further configured to extract the pupil direction of the user from the user image acquired by the camera, wherein the control unit is further configured to estimate the pupil direction for recognizing the sightline of the user using the extracted pupil direction and the measured pupil direction of the user.

3. The movable display apparatus according to claim 1, wherein the control unit is further configured to control the displaying of the image by the display unit according to a variation in the sightline of the user.

4. The movable display apparatus according to claim 1, wherein the control unit is further configured to decide the posture of the display unit such that a center of mass (COM), according to the motion of the display unit, is positioned on a center of the display unit.

5. A robot comprising:
a display unit movably provided on a manipulator and configured to display an image;
a camera provided on the display unit and configured to acquire an image of a user;
a head mounted device (HMD) configured to measure a head rotation direction and a pupil direction of the user;
a control unit configured to recognize a sightline of the user using the image of the user acquired by the camera and the head rotation direction and the pupil direction measured by the HMD, control a posture of the display unit according to the recognized sightline of the user, and control the displaying of the image by the display unit according to the recognized sightline of the user;
a driving unit configured to move the manipulator and change the posture of the display unit under the control of the control unit; and
a camera image processing unit configured to extract a face direction of the user from the image of the user acquired by the camera,
wherein the control unit is further configured to estimate the head rotation direction for recognizing the sightline of the user using the extracted face direction and the measured head rotation direction of the user, compute a difference between a sightline position of the user based on the recognized sightline of the user and the current position of the display unit, and generate a motion path of the manipulator.

6. The robot according to claim 5, wherein the camera image processing unit is further configured to extract the pupil direction of the user from the image of the user acquired by the camera, and the control unit is further configured to estimate the pupil direction for recognizing the sightline of the user using the extracted pupil direction and the measured pupil direction of the user.

7. The robot according to claim 5, wherein the control unit is further configured to check a variation in the center of mass (COM) when the display unit is positioned at the sightline position of the user, and move a main body of the robot.

8. The robot according to claim 5, wherein the control unit is further configured to change the image displayed on the display unit according to a variation in the sightline of the user.

9. A display method of a robot, the method comprising:
providing an image service using a display unit movably provided on a manipulator;
acquiring an image of a user who receives the image service;
measuring a head rotation direction and a pupil direction of the user using a head mounted device (HMD); and
recognizing a sightline of the user using the acquired image of the user and the measured head rotation direction and pupil direction of the user;
controlling a posture of the display unit according to the recognized sightline of the user to track the sightline of the user; and
controlling the displaying of the image by the display unit according to the recognized sightline of the user,
extracting a face direction of the user from the acquired image of the user,
wherein the controlling a posture of the display unit includes estimating the head rotation direction for recognizing the sightline of the user using the extracted face direction and the measured head rotation direction of the user, computing a difference between a sightline position of the user based on the recognized sightline of the user and a current position of the display unit, and generating a motion path of the manipulator.

10. The method according to claim 9, further comprising extracting a face direction of the user from the acquired image of the user, wherein the recognizing of the sightline of the user includes estimating the head rotation direction of the user using the extracted face direction and the measured head rotation direction of the user.

11. The method according to claim 9, further comprising extracting the pupil direction of the user from the acquired image of the user, wherein the recognizing of the sightline of the user includes estimating the pupil direction of the user using the extracted pupil direction and the measured pupil direction of the user.

12. The method according to claim 10, wherein the recognizing of the sightline of the user includes recognizing a sightline position of the user using the head rotation direction and the pupil direction.

13. The method according to claim 12, wherein the tracking of the sightline of the user includes checking a variation in the center of mass (COM) of the robot when the display unit is positioned at the sightline position of the user, and moving a main body of the robot.

14. The method according to claim 9, wherein the tracking of the sightline of the user includes changing the image displayed on the display unit according to a variation in the sightline of the user.

15. A robot comprising:
a display unit movably provided on a manipulator and configured to display an image;
a camera provided on the display unit configured to acquire an image of a user;
a data communication unit configured to receive a head rotation direction and a pupil direction of the user;
a control unit configured to recognize a sightline of the user using the image of the user acquired by the camera and the head rotation direction and the pupil direction received by the data communication unit, control a posture of the display unit according to the recognized sightline of the user, and atoll control the displaying of the image by the display unit according to the recognized sightline of the user;
a camera image processing unit configured to extract a face direction of the user from the image of the user acquired by the camera, wherein the control unit is further configured to estimate the head rotation direction for recognizing the sightline of the user using the extracted face direction and the received head rotation direction of the user; and
a driving unit configured to move the manipulator and change the posture of the display unit under the control of the control unit, wherein the control unit is configured to compute a difference between a sightline position of the user based on the sightline of the user and the current position of the display unit, and generate a motion path of the manipulator.

16. The robot according to claim 15, further comprising:
a head mounted device (HMD) affixed to the head of the user and configured to transmit the head rotation direction and the pupil direction received by the data communication unit.

17. The robot according to claim 15, wherein the robot is configured to change at least one of a position and an angle of the display unit according to the sightline of the user recognized by the control unit.

* * * * *